(12) United States Patent
Castiel (10) Patent No.: US 9,858,227 B2
(45) Date of Patent: Jan. 2, 2018

(54) HYBRID NETWORKING APPLICATION SWITCH

(71) Applicant: Silicom Ltd., Kfar Saba (IL)

(72) Inventor: David Castiel, Even-Yehuda (IL)

(73) Assignee: SILICOM LTD., Kfar Saba (IL)

( * ) Notice: Subject to any disclaimer, the term of this patent is extended or adjusted under 35 U.S.C. 154(b) by 286 days.

(21) Appl. No.: 14/616,708

(22) Filed: Feb. 8, 2015

(65) Prior Publication Data

US 2016/0232121 A1 Aug. 11, 2016

(51) Int. Cl.
| | |
|---|---|
| *H05K 7/10* | (2006.01) |
| *G06F 13/40* | (2006.01) |
| *G06F 13/42* | (2006.01) |
| *G06F 13/38* | (2006.01) |

(52) U.S. Cl.
CPC ...... *G06F 13/4022* (2013.01); *G06F 13/4068* (2013.01); *G06F 13/4282* (2013.01); *G06F 13/385* (2013.01); *G06F 13/409* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | |
|---|---|---|
| 5,325,491 A | 6/1994 | Fasig |
| 5,460,441 A | 10/1995 | Hastings et al. |
| 5,592,366 A | 1/1997 | Goldman et al. |
| 6,147,863 A | 11/2000 | Moore et al. |
| 6,198,633 B1 | 3/2001 | Lehman et al. |
| 6,507,882 B1 | 1/2003 | Golka et al. |
| 6,765,791 B2 | 7/2004 | Syring et al. |
| 6,985,967 B1 * | 1/2006 | Hipp .................. G06F 1/184 361/788 |
| 7,167,380 B2 | 1/2007 | Ice |

(Continued)

OTHER PUBLICATIONS

Baticle et al., "Combining CompactPCI & USB: A new approach to Industrial Computer", Real-Time Magazine 98-4, pp. 79-97, 1998.

(Continued)

*Primary Examiner* — Henry Tsai
*Assistant Examiner* — Aurangzeb Hassan
(74) *Attorney, Agent, or Firm* — D.Kligler IP Services Ltd.

(57) ABSTRACT

An apparatus, including a case having a front panel, and multiple transceiver modules mounted on the front panel. The apparatus also includes at least one midplane adapter card having a first connector configured to transport networking signals, and a second connector configured to transport bus signals. The apparatus additionally includes a switch input/output board mounted within the case, coupled to the multiple transceiver modules, and having multiple first slots configured to accept the first connectors, and networking switch circuitry coupled to the first slots and configured to establish a network connection between two or more of the transceiver modules. The apparatus further includes a motherboard mounted within the case, and having a bus with multiple second slots configured to accept the second connectors, and a processor configured to manage the networking switch circuitry and to receive and process data commands in response to communications received from the transceiver modules.

28 Claims, 6 Drawing Sheets

(56) References Cited

U.S. PATENT DOCUMENTS

| | | | |
|---|---|---|---|
| 7,210,586 B2 | 5/2007 | Ice | |
| 7,236,358 B2 | 6/2007 | Dobbs et al. | |
| 7,254,038 B2 | 8/2007 | Drako | |
| 7,489,522 B2 | 2/2009 | Hoshino et al. | |
| 7,720,385 B2 | 5/2010 | Dagan et al. | |
| 8,064,773 B2 | 11/2011 | Dagan et al. | |
| 8,107,256 B1 * | 1/2012 | Kondrat | G06F 1/186 361/788 |
| 8,199,523 B2 | 6/2012 | Castiel | |
| 2002/0161929 A1 | 10/2002 | Longerbeam et al. | |
| 2002/0199047 A1 | 12/2002 | Dupont et al. | |
| 2004/0004822 A1 | 1/2004 | Ruckerbauer et al. | |
| 2006/0200600 A1 | 9/2006 | Groso | |
| 2007/0294433 A1 * | 12/2007 | Leigh | H04L 49/00 709/250 |
| 2010/0195289 A1 | 8/2010 | Hubal | |
| 2010/0318708 A1 * | 12/2010 | Castiel | G06F 13/409 710/301 |
| 2014/0016637 A1 * | 1/2014 | Masood | H04L 12/4013 370/390 |

OTHER PUBLICATIONS

Benner et al., "Exploitation of optical interconnects in future server architectures", IBM Journal of Research & Development, vol. 49, No. 4, pp. 755-775, Jul./Sep. 2005.

International Application PCT/IB2010/051518 Search Report dated Sep. 17, 2010.

U.S. Appl. No. 12/756,201 Office Action dated Dec. 19, 2011.

Silicom Ltd., "Moving Up the Value Chain: Silicom Introduces Patent-Pending SETAC—Server to Appliance Converter—A Unique Solution for Network Appliances", Israel, Jul. 21, 2009.

Silicom Ltd., "Pyramid Computer GMBH, Leading European Supplier of Appliance Servers, Chooses Silicom's SETAC", Israel, Dec. 15, 2009.

"Ethernet Tunneling through PCI Express Inter-Processor Communication, Low Latency Storage IO", Computer Technology Review, 13 pages, Jan. 19, 2009.

"PRO 600—PCI Bus extender", Cyber Research, 2 pages, Aug. 2009.

Intel Corporation, "Intel® Ethernet Switch FM6000 Series", Product Brief, 2 pages, year 2013.

Intel Corporation, "Intel® Ethernet Controller XL710 10/40 GbE", Product Brief, 4 pages, year 2015.

Intel Corporation, "Direct Media Interface", http://en.wikipedia.org/wiki/Direct_Media_Interface, 4 pages, Nov. 6, 2014.

Intel Corporation, "Flexible Display Interface", http://en.wikipedia.org/wiki/Flexible_Display_Interface, 2 pages, Nov. 8, 2013.

* cited by examiner

HYBRID NETWORKING APPLICATION SWITCH

FIELD OF THE INVENTION

The present invention relates generally to rack mounted systems, and specifically to combining functionalities of a rack mounted networking switch and a rack mounted server into a single rack mounted enclosure comprising a hybrid networking application switch or an accelerated hybrid networking application switch.

BACKGROUND

Server racks (also known as data center racks) are used in data centers to hold computer hardware modules such as network servers and networking switches. The server racks comprise standardized frames or enclosures for mounting multiple hardware modules. Equipment designed to be placed in a rack is typically described as a rack-mount, a rack-mount instrument, a rack mounted system, a rack mount chassis, a subrack, or rack mountable. The height of the hardware modules in server racks is typically standardized as multiples of 1.752 inches (44.50 mm), or one rack unit (also referred to simply as U).

The description above is presented as a general overview of related art in this field and should not be construed as an admission that any of the information it contains constitutes prior art against the present patent application.

SUMMARY

There is provided, in accordance with an embodiment of the present invention, an apparatus including a case having a front panel, multiple transceiver modules mounted on the front panel, at least one midplane communication adapter card including a first bus connector configured to transport networking signals and a second bus connector configured to transport bus signals, a networking switch including a switch input/output (I/O) board mounted within the case, coupled to the multiple transceiver modules, and including multiple first bus slots configured to accept the first bus connectors, and networking switch circuitry coupled to the first bus slots and configured to establish a network connection between two or more of the transceiver modules, and a server including a computer motherboard mounted within the case, the computer motherboard including a bus having multiple second bus slots configured to accept the second bus connectors, and a processor configured to manage the networking switch circuitry and to receive and process data commands in response to communications received from the transceiver modules.

In some embodiments, the case has a standard form factor configured to be inserted into a data center rack. In additional embodiments, the computer motherboard includes a standard size computer motherboard, and accepting the first and the second bus connections establishes a board-to-board connection between the switch I/O board and the computer motherboard. In further embodiments, the second bus slots lie in proximity to each other on the standard size motherboard.

In supplementary embodiments, the first and the second bus connectors include PCI-E bus connectors, and the first and the second bus slots include PCI-E bus slots. In embodiments where the first and the second bus connectors include PCI-E bus connectors and the first and the second bus slots include PCI-E bus slots, the bus signals may include PCI-E data packets.

In some embodiments, the switch I/O board and the computer motherboard are mounted within the case so that the first bus slots are adjacent to the second bus slots. In additional embodiments, the networking switch includes a network element selected from a list consisting of a network process, a field programmable gate array (FPGA) device, and a multiport networking device.

There is also provided, in accordance with an embodiment of the present invention, a method including providing a case including a front panel, mounting multiple transceiver modules on the front panel, providing at least one midplane communication adapter card including a first bus connector configured to transport networking signals, and a second bus connector configured to transport bus signals, mounting, within the case, a networking switch including a switch I/O board, the switch I/O board being coupled to the multiple transceiver modules, and including multiple first bus slots configured to accept the first bus connectors, and network switch circuitry coupled to the first bus slots and configured to establish a network connection between two or more of the transceiver modules, mounting, within the case, a server including a computer motherboard, the computer motherboard including a processor and a bus having multiple second bus slots configured to accept the second bus connectors, managing, by the processor, the networking switch circuitry, and receiving and processing, by the processor, data in response to communications received from the transceiver modules.

There is additionally provided, in accordance with an embodiment of the present invention, an apparatus including a printed circuit board having a bottom edge, a first end, and a second end, a first bus connector protruding from the bottom edge at the first end, a second bus connector protruding from the bottom edge at the second end, a network controller mounted on the printed circuit board, a first data link that transfers bus signals between the network controller and the first bus connector, and a second data link that transfers networking signals between the network controller and the second bus connector.

In some embodiments, the first and the second bus connectors include PCI-E bus connectors. In embodiments where the first and the second bus connectors include PCI-E bus connectors, the bus signals may include PCI-E data packets. In further embodiments, the network controller includes an Ethernet controller, and the networking signals include Ethernet frames.

There is further provided, in accordance with an embodiment of the present invention, a method including providing a printed circuit board having a bottom edge, a first end, and a second end, the printed circuit board including a first bus connector protruding from the bottom edge at the first end, and a second bus connector protruding from the bottom edge at the second end, mounting a network controller on the printed circuit board, mounting, on the printed circuit board, a first data link that transfers bus signals between the network controller and the first bus connector, and mounting, on the printed circuit board, a second data link that transfers networking signals between the network controller and the second bus connector.

There is also provided, in accordance with an embodiment of the present invention, an apparatus including a printed circuit board having a bottom edge, a first end, and a second end, a first bus connector protruding from the bottom edge at the first end, a second bus connector protruding from the bottom edge at the second end, a network processor mounted on the printed circuit board, a first data link that transfers bus signals between the network processor and the first bus connector, and a second data link that transfers networking signals between the network processor and the second bus connector.

In some embodiments, the first and the second bus connectors include PCI-E bus connectors. In embodiments where the first and the second bus connectors include PCI-E bus connectors, the bus signals may include PCI-E data packets.

There is additionally provided, in accordance with an embodiment of the present invention, a method including providing a printed circuit board having a bottom edge, a first end, and a second end, the printed circuit board including a first bus connector protruding from the bottom edge at the first end, and a second bus connector protruding from the bottom edge at the second end, mounting a network processor on the printed circuit board, mounting, on the printed circuit board, a first data link that transfers bus signals between the network processor and the first bus connector, and mounting, on the printed circuit board, a second data link that transfers networking signals between the network processor and the second bus connector.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide systems that combine the functionality of a server and a networking switch into a single rack mountable hardware module, referred to herein as a hybrid networking application switch. In embodiments described herein, the server in the hybrid networking application switch may comprise a standard computer motherboard that can be mounted in a standard form factor that can be installed in a data center rack. In rack mounted systems, standard form factors include "1U", "2U" (and so on) cases that are 19 inches wide, where each "U" comprises a height of 1.752 inches.

As described hereinbelow, the hybrid networking application switch comprises a case having a front panel, a server and a networking switch that are mounted within the case, and one or more midplane communication adapter cards (also referred to herein as management adapters) that provide a connection between the server and the networking switch. In some embodiments, the hybrid networking switch application switch may be configured as a "top of rack" switch comprising communication ports and a standard hard disk envelope mounted on a front panel of a single standard form factor enclosure. The multiple communications ports mounted on the front panel may also be referred to herein as a front input/output (I/O) switch.

The networking switch comprises multiple network transceiver modules that are mounted on the front panel, a switch input/output (I/O) board, and multiple midplane communication adapter cards. In embodiments of the present invention, the midplane communication adapter cards that enable the connection have a unique PCI-E form factor and are configured to provide a network connection between the motherboard and the front I/O switch board. The multiple transceiver modules in the front I/O switch are coupled to multiple switch I/O board bus slots (also referred to herein as first bus slots) and networking switch circuitry that is configured to establish a network connection between two or more of the network transceiver modules.

In some embodiments of the present invention, the server comprises a storage device. As described hereinbelow, the computer motherboard may comprise a bus having multiple second bus slots, and has a processor that is configured to manage the networking switch circuitry and to receive and process data commands in response to communications received from the transceiver modules.

Each of the midplane communication adapter cards comprises a first bus connector that is configured to be inserted into a given first bus slot on the switch I/O board, and a second bus connector that is configured to be inserted into a given second bus slot on the computer motherboard. In embodiments of the present invention, the first bus connectors are configured to transport networking signals (e.g., Ethernet frames) to and from the first bus slots, and the second bus connectors are configured to transport bus signals (e.g., PCI-E data packets) to and from the second bus slots, thereby providing a network connection between the server and the networking switch.

In a first embodiment, the midplane communication adapter cards comprise network controllers such as Ethernet controllers. In a second embodiment, the midplane communication adapter cards may comprise network processors that enable accelerating the networking performance between the server and the networking switch by offloading network intensive processing from server's processor(s) to the network processors on the midplane communication adapter cards. In embodiments where the midplane communication adapter cards comprise network processors, the hybrid networking application switch may also be referred to as an accelerated hybrid networking application switch.

By combining a server and a networking switch into a single hardware module (i.e., the hybrid networking application switch), systems implementing embodiments of the present invention may use less space and power than two separate hardware modules. Additionally, since networking switches typically have a 4-8 year life span and servers typically have a two year lifespan, systems implementing embodiments of the present invention enable each server of the systems to be easily upgraded (i.e., by swapping out the computer motherboard or the switch I/O board for a newer version).

Further advantages of the hybrid networking application switch may include increased throughput between the networking switch and the server, due to the increased throughput of the multiple communication adapter cards, and having better and closer control of the networking switch (i.e., integration between the server and the networking switch). Additionally, since a single processor controls the server and the networking switch, server management software can be optimized to performing operations such as load balancing and connection management routing.

Systems implementing embodiments of the present invention can reduce capital and operating expenditures due to factors such as:

The hybrid networking application switch can use a single processor on the computer motherboard to control operation of the server and the networking switch (i.e., as opposed to separate processors for the server and the networking switch).

The hybrid networking application switch stores the server and the networking switch in a single case or enclosure. In other words, the functionality of the hybrid networking application switch combines the functionality of two traditional enclosures (i.e., a server in one enclosure and a networking switch in another enclosure) into a single enclosure, thereby saving space in server racks, and therefore saving space in data centers.

Embodiments of the present invention can help reduce power consumption in data centers, since the hybrid networking application switch may comprise a single power supply to power the server and the networking switch.

Embodiments of the present invention can help reduce equipment cost, since the hybrid networking application does not require any additional networking cables or network transceiver modules to connect the server and the networking switch.

System Description

Figure 1A:
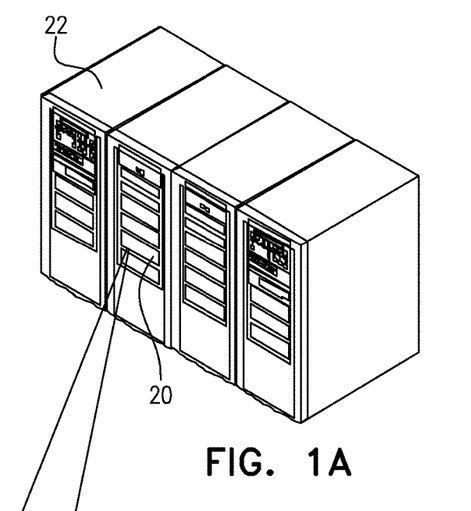
FIG. 1A is a schematic pictorial illustration of a hybrid networking application switch that combines a server module and a networking switch module into a single enclosure, in accordance with an embodiment of the present invention.
Figure 1B:
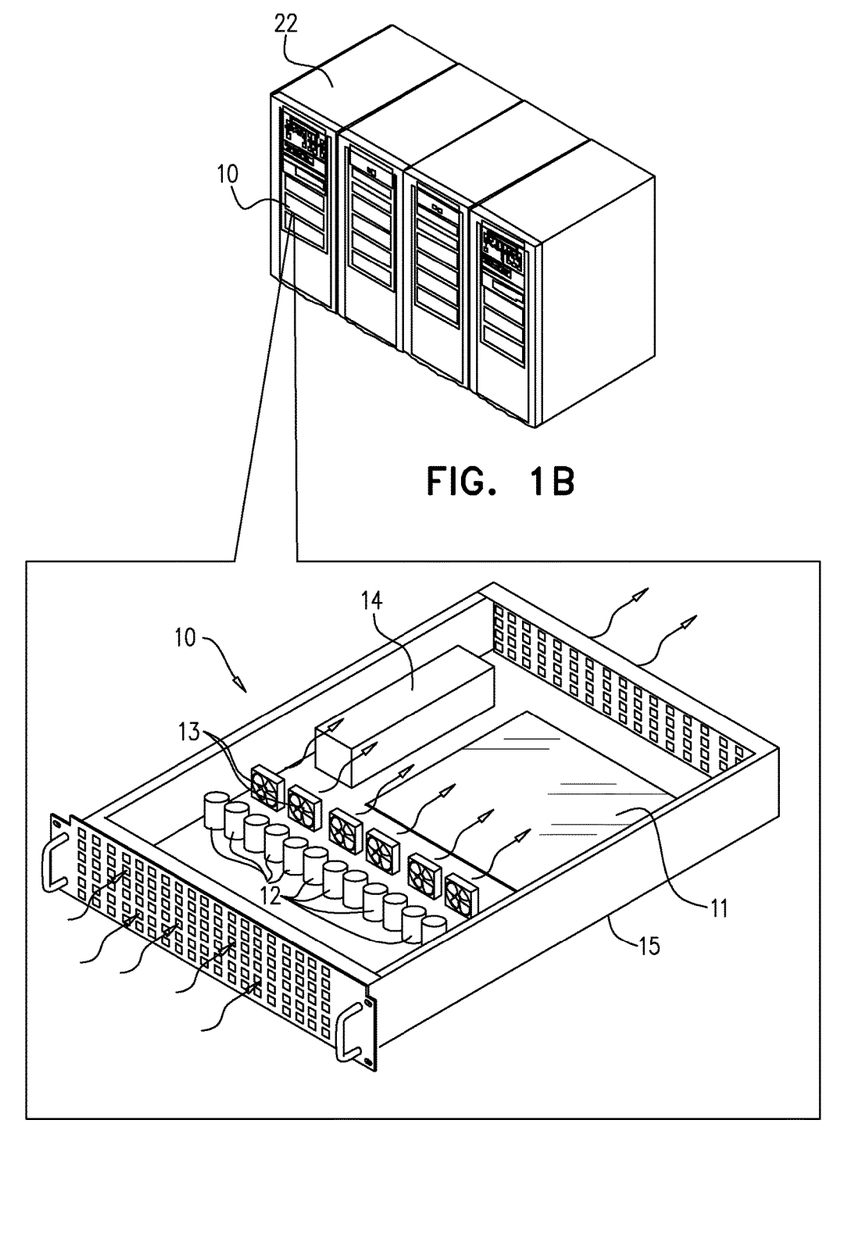
FIG. 1B is a schematic pictorial illustration of a rack mountable server, in accordance with an embodiment of the present invention.

FIGS. 1A, 1B, 2 and 3 schematically illustrate a rack 22 comprising a file server 10 and hybrid networking application switch 20 that can be mounted in a network equipment rack 22, in accordance with an embodiment of the present invention. FIGS. 1A and 1B may also be collectively referred to as FIG. 1. In embodiments of the present invention, hybrid networking application switch 20 combines a server 24 and a networking switch 26 into a first case 28 that is configured to be mounted into a single slot of rack 22. Hybrid networking application switch 20 (FIG. 1A) comprises a first computer motherboard 30, a switch I/O board 32, one or more storage devices 34 and a power supply 36 that are mounted in case 28. In alternative configurations, hybrid networking application switch 20 may comprise two or more redundant power supplies 36 mounted in case 28.

Figure 3:
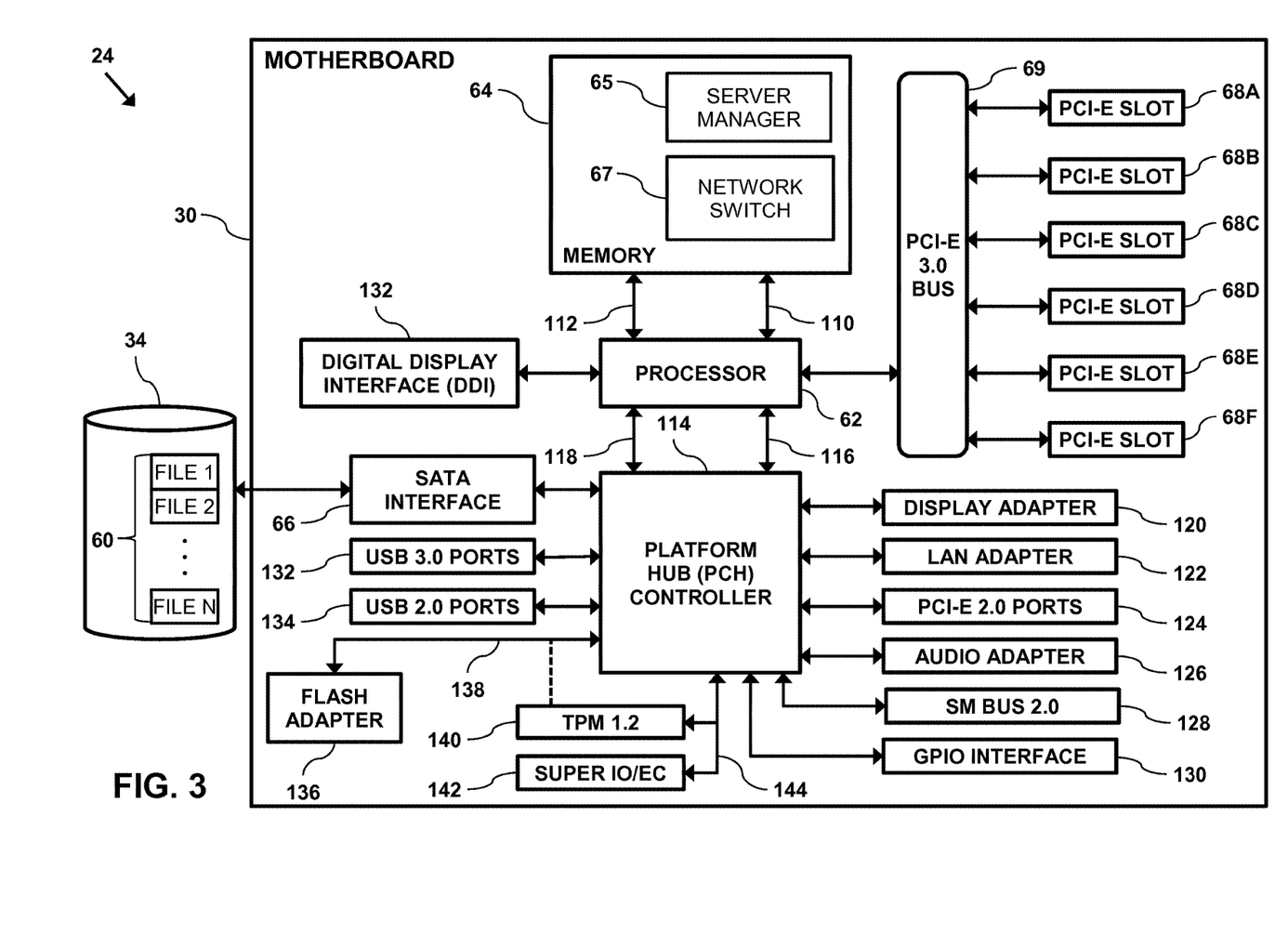
FIG. 3 is a block diagram that schematically illustrates the server module comprising a computer motherboard and a storage device, in accordance with an embodiment of the present invention.

In embodiments of the present invention, motherboard 30 is typically an industry standard motherboard that has multiple motherboard bus slots 68 that lie in proximity to each other (and typically parallel to each other) on the first motherboard, as shown in FIG. 3. Examples of industry standard motherboards that can be used for motherboard 30 include, but are not limited to, Advanced Technology eXtended (ATX) motherboards, Extended ATX (E-ATX) motherboards, Enhanced Extended ATX (EE-ATX) motherboards and Server System Infrastructure (SSI) motherboards.

In the configuration shown in FIG. 1A, multiple network (e.g., Ethernet) transceiver modules 38 are mounted on a front panel 40 of case 28, and multiple cooling fans 42 are mounted on a rear panel 44 of the case. In some embodiments, transceiver modules 38 may comprise small factor pluggable plus (SFP+) transceivers, Quad Small Form-factor Pluggable Plus (QSFP+) transceivers, QSFP28, compact form pluggable (CFP4) transceivers, or optical transceiver modules that can be configured to serve as active ports for connection to fiber optic cables (not shown). Additional types of transceiver modules 38 include, but are not limited to, copper transceivers and direct copper I/O ports.

In embodiments of the present invention, motherboard 30 and switch I/O board 32 communicate via midplane adapters 46 and a management adapter 48. Midplane adapters 46 and management adapter 48 are also referred to herein as communication adapter cards. The configurations of communication adapter cards 46 and 48, as well as their insertion into motherboard 30 and switch I/O board 32 is described in the description referencing FIGS. 4, 5, 6 and 7, hereinbelow. As described in the description referencing FIG. 4, midplane adapter 46 may comprises a network controller such as an Ethernet controller. In additional embodiments, the midplane adapters coupling motherboard 30 and switch I/O board 32 may comprise network processors, as described in the description referencing FIG. 5 hereinbelow.

File server 10 (FIG. 1B) comprises a second computer motherboard 11, storage devices 12, fans 13, and a power supply 14 that are mounted in a second case 15. In the configuration shown in FIG. 1, cases 15 and 28 have similar dimensions, and can therefore be mounted into the same standard form factor (e.g., 1U or 2U) in rack 22.

Figure 2:
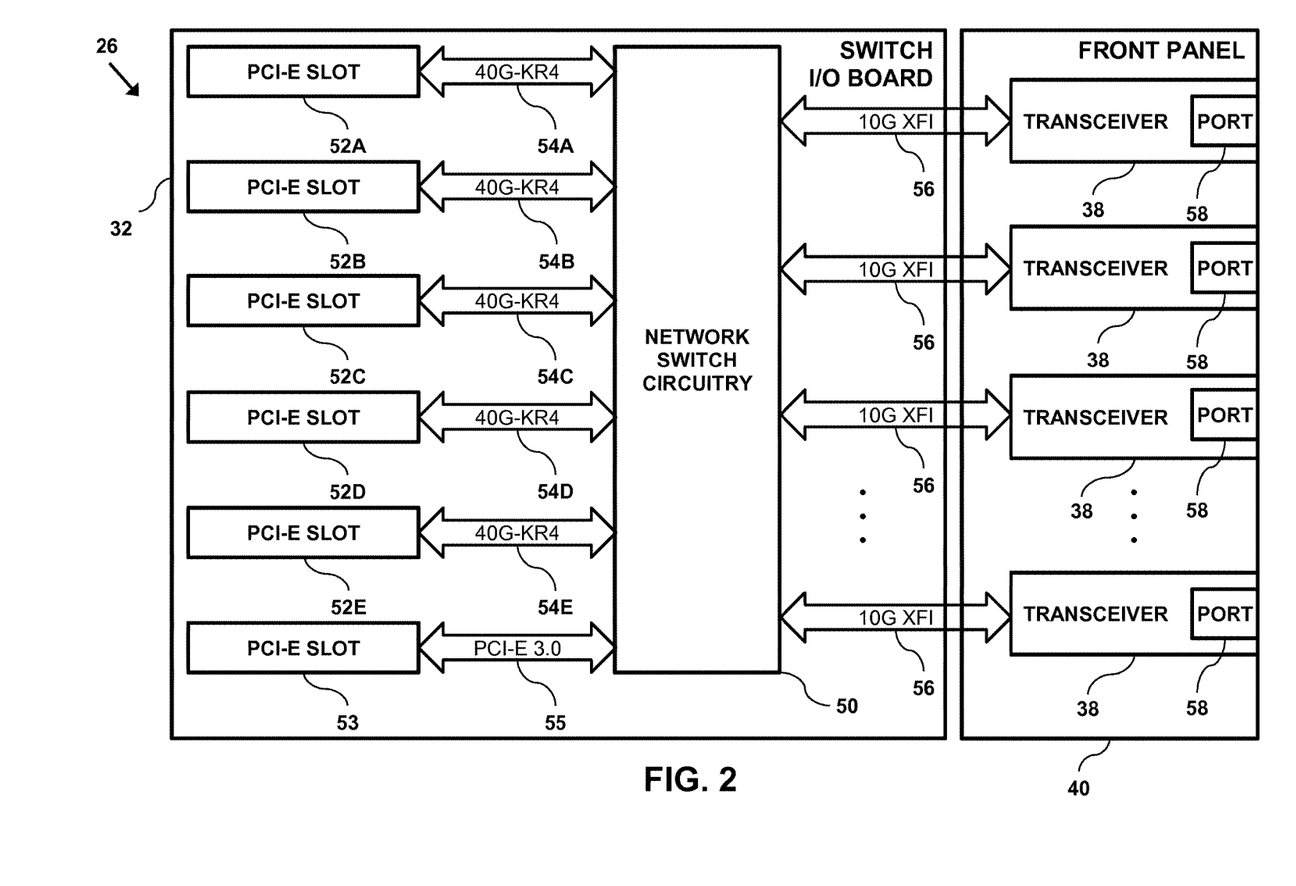
FIG. 2 is a block diagram that schematically illustrates the networking switch module comprising a switch input/output (I/O) board and transceiver sub-modules, in accordance with an embodiment of the present invention.

In embodiments of the present invention, networking switch 26 comprises switch I/O board 32 (FIG. 2). Switch I/O board 32 (also referred to herein as front I/O switch 32) comprises networking switch circuitry 50 that is coupled to first switch I/O board bus slots 52 via first data links 54. Networking switch circuitry 50 is also coupled to a second switch I/O board bus slot 53 via a second data link 55, and to transceiver modules 38 via third data links 56. In FIG. 2, first switch I/O board bus slots 52 and data links 54 can be differentiated by appending a letter to the identifying numeral, so that the switch I/O board bus slots comprise switch I/O board bus slots 52A-52E, and the first data links comprise first data links 54A-54E.

In some embodiments, first switch I/O board bus slots 52 comprise Peripheral Component Interconnect Express (PCI-E) bus slots, and data links 54 comprise 40 GBASE-KR4 data links that are configured to implement scrambled encoding over four pairs of traces (not shown) in each direction to allow high bandwidth data transfer between networking switch circuitry 50, bus slots 52 and transceiver modules 38. While the configuration shown in FIG. 2 shows data links 56 comprising a 10 G XFI link that provides a separate 10 gigabit (10 G) serial interface between networking switch circuitry 50 and each transceiver module 38, other types of data links are considered to be within the spirit and scope of the present invention. Examples of other types of data links 56 include, but are not limited to, 1 G/40 G/100 G data links or network connections.

Networking switch circuitry 50 may be based, for example, on the FM6000 series of Ethernet media access controllers (EMACS) produced by Intel Corporation (Santa Clara, Calif.), switch circuitry produced by Broadcom Corporation (Irvine, Calif.), or any other type of networking switch circuitry. In operation, networking switch circuitry 50 is configured to establish a network connection between multiple networked devices by filtering and forwarding data packets between network segments. Networking switch circuitry 50 typically operates at the data link layer (layer 2) and sometimes the network layer (layer 3) of the Open Systems Interconnection (OSI) reference model, and therefore can support any packet protocol.

Each transceiver module 38 comprises a port 58 at front panel 40 for receiving high-speed communication cables. For example, ports 58 may comprise standard RJ-45 sockets for connecting to Ethernet cables. Alternatively, the ports may comprise receptacles for electrical or optical connectors and/or transceiver modules of other types. Typically, ports 58, transceiver modules 38 and networking switch circuitry 50 are capable of operating at network or I/O speeds of at least one megabit per second, and speeds of 1/10/40/100 gigabits per second or more may be supported.

In operation, bus slots 52 are configured to convey network data packets (e.g., Ethernet frames) to and from networking switch circuitry 50. Therefore, in embodiments where networking switch 26 comprises a PCI EMAC, bus slots 52 and transceiver modules 38 can have different form factors but may be functionally identical. For example, transceiver modules 38 may comprise ports 58 configured to accept Ethernet cables with RJ45 plugs (not shown), and bus slots 52 may comprise PCI-E bus slots configured to accept PCI-E connectors of midplane adapters 46, as described in the description referencing FIGS. 4 and 6 hereinbelow. In other words, even though bus slots 52 may comprise a standard bus form factor such as PCI-E, they can be configured to carry native network data packets (i.e., as opposed to network data packets tunneled inside PCI-E data packets).

In some embodiments, second switch I/O board bus slot 53 may also comprise a PCI-E bus slot, and data link 55 may comprise a PCI-E data link. While the physical form factor of bus slots 52 and 53 may be identical, bus slots 52 are configured to transfer network packets between server 24 and networking switch circuitry 50, and bus slot 53 is configured to transfer bus data packets (e.g., PCI-E data packets) between the server and the networking switch circuitry. For example, server can convey data packets to networking switch circuitry 50 (via switch I/O board bus slot 53 and data link 55) in order to instruct the networking switch circuitry to perform networking switch management functions such as load balancing and connection management routing.

While embodiments herein describe networking switch 26 comprising switch I/O board 32, other configurations of the networking switch in hybrid networking application switch 20 are considered to be within the spirit and scope of the present invention. For example, networking switch 26 may comprise a network element such as a network process, a field programmable gate array (FPGA) device, and a multiport networking device.

Server 24 comprises motherboard 30 and storage device 34 that stores files 60. Examples of storage device 34 include, but are not limited to, hard disks and solid state drives (SSDs). While the configuration in FIG. 2 shows server 24 comprising a single storage device 34, a server comprising a plurality of the storage devices mounted in case 28 is considered to be within the spirit and scope of the present invention. In some embodiments, front panel 40 may comprise Universal Serial Bus (USB) slots and/or memory card slots that can accept flash memory storage devices that can be configured as additional storage devices 34 in server 24.

Motherboard 30 (FIG. 3) comprises a processor 62, a memory 64, and a platform hub (PCH) controller 114. Processor 62 is coupled to memory 64 via memory channels 110 and 112, and the processor is coupled to platform hub controller 114 via data connections 114 and 116. In some embodiments, data connection 116 comprises a Direct Media Interface (DMI) 2.0 data connection, and data connection 118 comprises a display interconnect such as the Flexible Display Interface (FDI) produced by Intel Corporation (Santa Clara, Calif.).

Processor 62 is also coupled to a digital display interface (DDI) 132 and a bus 69 coupled to motherboard bus slots 68. In the configuration shown in FIG. 3, bus 69 comprises a PCI-E high speed serial bus, and motherboard bus slots 68 comprise PCIE-E bus slots. In FIG. 3, motherboard bus slots 68 can be differentiated by appending a letter to the identifying numeral, so that the motherboard bus slots comprise motherboard bus slots 68A-68F. While the configuration in FIG. 3 shows motherboard 30 comprising a single processor 62, multiprocessor versions of motherboard 30 are considered to be within the spirit and scope of the present invention.

In some embodiments, motherboard 30 also comprises a disk controller 66, a display adapter 120, a local area network (LAN) adapter 122, multiple PCI-E 2.0 ports 124, an audio adapter 126, a system management (SM) bus 128, a general purpose input/output (GPIO) interface 130, multiple universal serial bus (USB) 3.0 ports 132, multiple USB 2.0 ports 134, a flash memory card adapter 136, a trusted platform module (TPM) 140, and a super input/output embedded controller (IO/EC) 142 that are all coupled to PCH 114. In the configuration shown in FIG. 3, disk controller 66 comprises a Serial Advanced Technology Attachment (SATA) interface that couples storage device 34 to PCH 114, SPI flash adapter 136 is coupled to PCH controller 114 via a Serial Peripheral Interface (SPI) 138, and TPM 140 and super IO/EC 142 are both coupled to PCH controller 114 via a Low Pin Count (LPC) bus 144.

Processor 62 is configured to execute, from memory 64, a server manager 65 and a networking switch manager 67. The operation of server manager 65 and networking switch manager 67 are described hereinbelow.

Processor 62 typically comprises a general-purpose central processing unit (CPU), which is programmed in software to carry out the functions described herein. The software may be downloaded to hybrid networking application switch 20 in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

Figure 4:
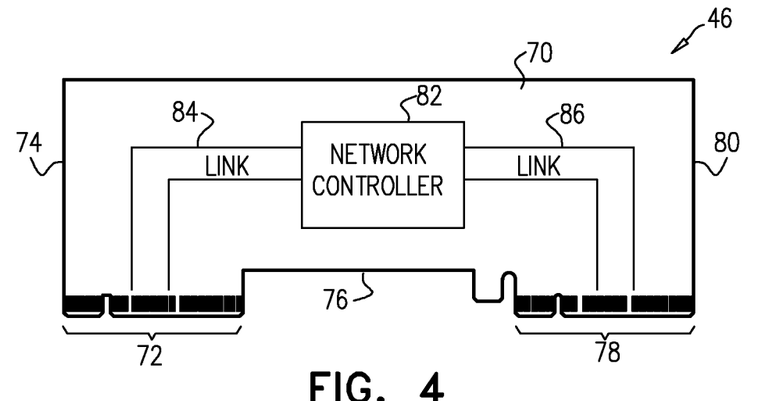
FIG. 4 is a schematic diagram that schematically illustrates a midplane adapter comprising a network controller and configured to provide a network connection between the switch I/O board and the computer motherboard, in accordance with an embodiment of the present invention.

FIG. 4 is a schematic diagram of midplane adapter 46 that is configured to provide a network connection between switch I/O board 32 and motherboard 30, in accordance with an embodiment of the present invention. Midplane adapter 46 comprises a printed circuit board 70 that has a bus connector 72 protruding from a bottom edge 76 at a first end 74 of midplane adapter 46, and a bus connector 78 protruding from bottom edge 76 at a second end 80 of midplane adapter 46.

Printed circuit board 70 comprises network controller 82, a first data link 84 that that couples the network controller with bus connector 72, and a second data link 86 that that couples the network controller with bus connector 78. Network controller 82 comprises a circuit that enables a computer (in this case server 24) to communicate with a network. In some embodiments network controller 82 comprises an Ethernet controller such as the Fortville XL710 Ethernet controller produced by Intel Corporation (Santa Clara, Calif.).

In operation, data link 84 is configured to transfer networking signals (e.g., Ethernet frames) between network controller 82 and bus connector 72, and data link 86 is configured to transfer bus signals (e.g., PCI-E data packets) between network controller 82 and bus connector 78. Therefore, plugging bus connector 72 into a given bus slot 52 and plugging bus connector 78 into a given bus slot 68 establishes a network connection between server 24 and networking switch 26.

Figure 5:
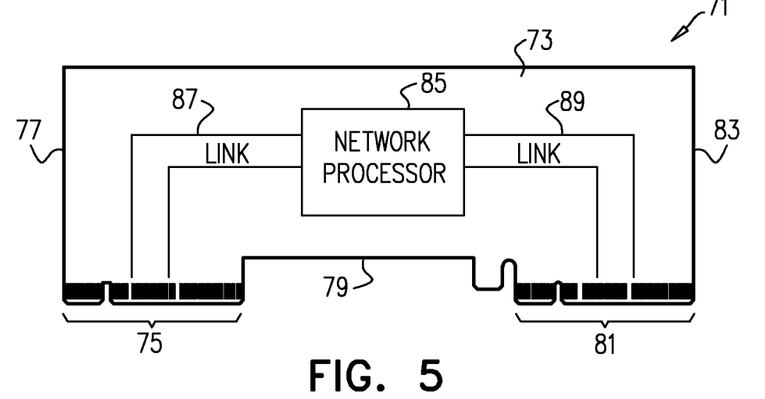
FIG. 5 is a schematic diagram that schematically illustrates a midplane adapter comprising a network processor and configured to provide a network connection between the switch I/O board and the computer motherboard, in accordance with an embodiment of the present invention.

FIG. 5 is a schematic diagram of a midplane adapter 71 that is configured to provide a network connection between switch I/O board 32 and motherboard 30, in accordance with an embodiment of the present invention. In embodiments of the present invention, the communication adapter cards that provide a network connection between switch I/O board 32 and motherboard 30 may comprise any combination of midplane adapters 46 and 71.

Midplane adapter 71 comprises a printed circuit board 73 that has a bus connector 75 protruding from a bottom edge 79 at a first end 77 of midplane adapter 71, and a bus connector 81 protruding from bottom edge 79 at a second end 83 of midplane adapter 71. Printed circuit board 73 comprises network processor 85, a first data link 87 that that couples the network processor with bus connector 75, and a second data link 89 that that couples the network processor with bus connector 81.

Network processor 85 typically comprises one or more central processing units configured to provide a high-speed networking connection between computing devices such as server and networking switch 26. In some embodiments network processor 85 comprises a central processing unit such as the XLPII™ family of network processors produced by Broadcom Corporation (Irvine, Calif.).

In operation, data link 87 is configured to transfer networking signals (e.g., Ethernet frames) between network processor 85 and bus connector 75, and data link 89 is configured to transfer bus signals (e.g., PCI-E data packets) between the network processor and bus connector 81. Therefore, plugging bus connector 75 into a given bus slot 52 and plugging bus connector 81 into a given bus slot 68 establishes a network connection between server 24 and networking switch 26.

Typically, midplane adapter 71 has a more networking processing capabilities and networking engines than network processor 85. Therefore, using midplane adapters 71 to accelerate performance between switch I/O board 32 and motherboard 30 can enhance performance of hybrid networking application switch 20.

Figure 6:
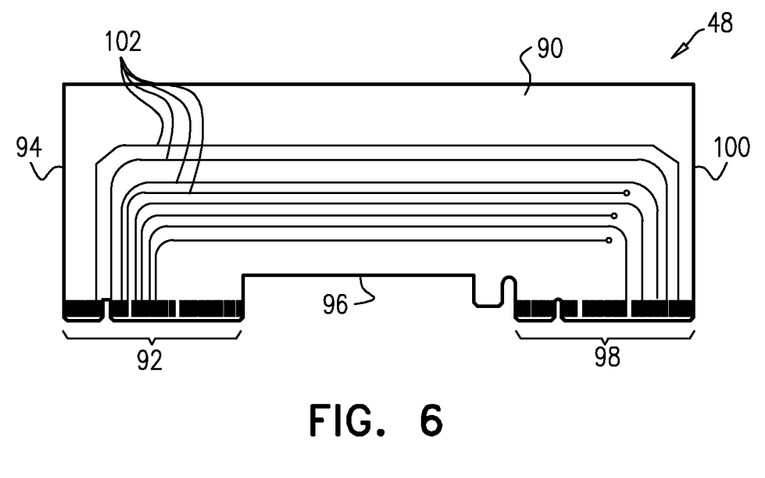
FIG. 6 is a schematic diagram that schematically illustrates a management adapter configured to convey bus signals between the switch I/O board and the computer motherboard, in accordance with an embodiment of the present invention.

FIG. 6 is a schematic diagram of management adapter 48 that is configured to convey bus signals between switch I/O board 32 and motherboard 30, in accordance with an embodiment of the present invention. Management adapter 48 comprises a printed circuit board 90 that has a bus connector 92 protruding from a bottom edge 96 at a first end 94 of management adapter 48, and a bus connector 98 protruding from bottom edge 96 at a second end 100 of the management adapter. Printed circuit board 90 comprises a data link 102 that couples bus connector 92 to bus connector 98, thereby enabling processor 62 to convey data to network management circuitry 50 using standard bus communication protocols such as PCI-E data packets.

Figure 7:
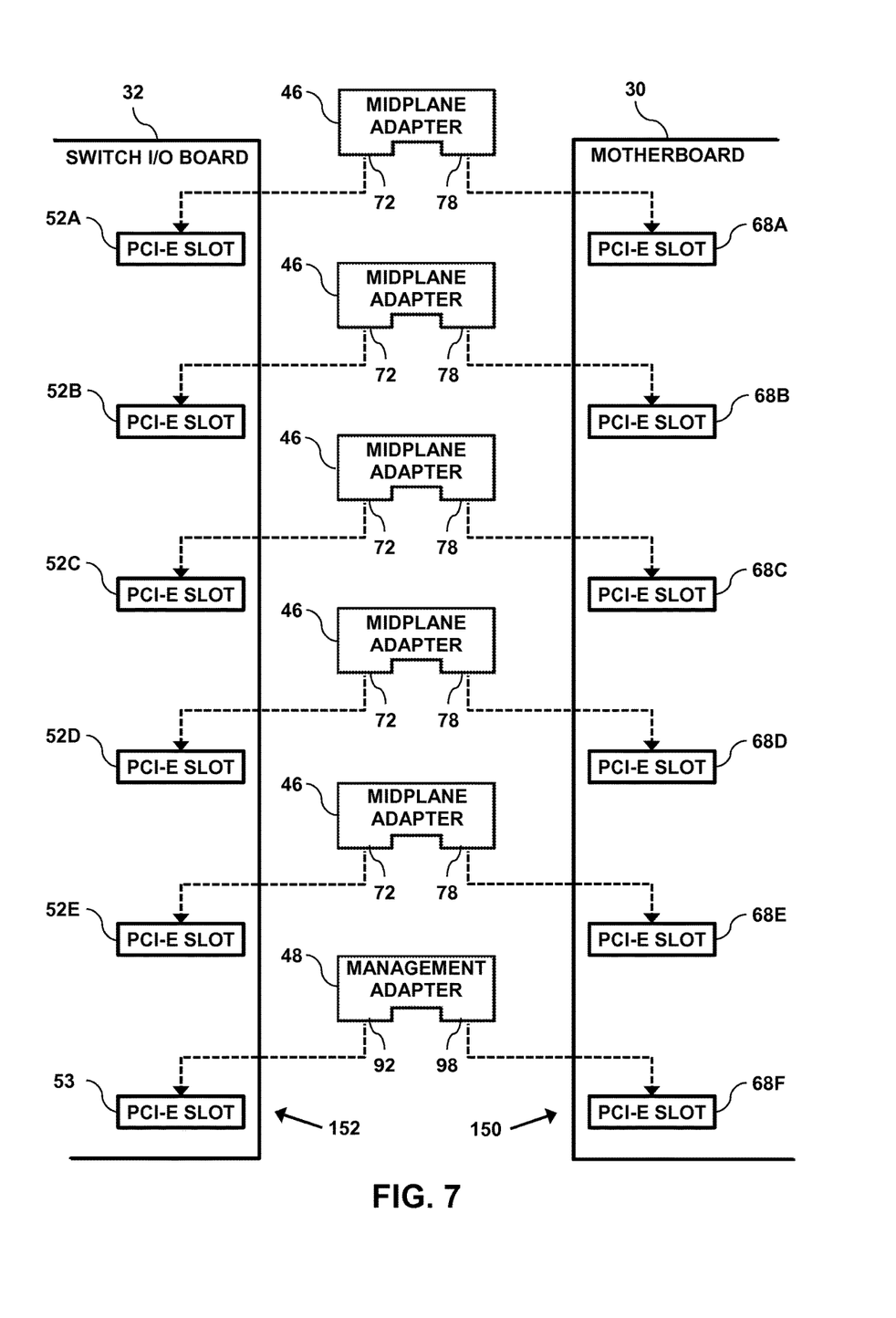
FIG. 7 is a block diagram that schematically illustrates mounting the management adapter and a plurality of the midplane adapters in the switch I/O board and the computer motherboard, in accordance with an embodiment of the present invention.

FIG. 7 is a block diagram that schematically illustrates mounting management adapter 48 and midplane adapters 46 in switch I/O board 32 and motherboard 30, in accordance with an embodiment of the present invention. In embodiments of the present invention, inserting bus connectors 72 into bus slots 52 and inserting bus connectors 78 into bus slots 68 enables midplane adapters 46 to establish mirrored network connections between networking switch 26 and server 24, and inserting bus connector 92 into bus slot 53 and inserting connector 98 into bus slot 68F enables management adapter 48 to establish bus-level (e.g., PCI-E) communication between processor 62 and networking switch circuitry 50.

As shown in FIGS. 1 and 7, motherboard 30 and switch I/O board 32 are mounted in case 28 so that bus slots 52 and 53 are adjacent to bus slots 68. In other words, a side 150 of motherboard 30 where bus slots 68 are mounted (i.e., an edge of motherboard 30 in proximity to bus slots 68) is adjacent to a side 152 of the switch I/O board 32 where bus slots 52 and 53 are mounted (i.e., an edge of the switch I/O board 32 in proximity to bus slots 52 and 53). Therefore, in hybrid networking application switch 20, bus slots 68 face front panel 40.

While the example in FIG. 7 shows midplane adapters 46 providing mirrored network connections between switch I/O board 32 and motherboard 30, inserting bus connectors 75 into bus slots 52 and inserting bus connectors 81 into bus slots 68 enables midplane adapters 71 to establish the network connections. The network connections provided by midplane adapters 48 and/or 71 are also referred to herein as board-to-board connections between switch I/O board 32 and motherboard 30.

In operation, networking switch circuitry 50 establishes a network connection between a client computer (not shown) and server manager 65 that is being executed by processor 62. The network connection comprises a given transceiver module 38, a given link 56, a given link 54, a given bus slot 52, a given midplane adapter 46, a given bus slot 68 and bus 69.

The network connection between server 24 and networking switch 26 enables the server to process data commands that hybrid networking application switch 20 receives from the client computer that is networked with the hybrid networking application switch. For example, in embodiments where server 24 is configured as a file server, that data commands may comprise data storage commands (i.e., with respect to storage device 34) that processor 62 receives and processes in response to communications received from transceiver modules 38. Examples of storage commands include, but are not limited to, requests to read data from a given file 60, and requests to write data to a given file 60.

In addition to configuring shows server 24 as a file server, other configurations for the server are considered to be within the spirit and scope of the present invention. For example, server 24 can be configured as an email server, a database server, a firewall, a security server, an enterprise resource planning (ERP) server and a wide area network (WAN) acceleration server. Therefore, examples of data commands received and processed by processor 62 include, but are not limited to, email commands, database commands, firewall commands, security commands, ERP commands and acceleration commands.

In operation, plugging bus connector 92 into bus slot 53 and plugging bus connector 98 into a given bus slot 68 establishes a data connection (e.g., PCI-E) between processor 62 and networking switch circuitry 50. The data connection between processor 62 and networking switch circuitry 50 enables networking switch manager 67 executing on the processor to manage load balancing and connection management routing.

In some embodiments, networking switch circuitry 50 may comprise a PCI-E media access controller (MAC) that enables server 26 and networking switch 24 to implement a network connection using network signals comprising PCI-E data packets. In embodiments where networking switch circuitry 50 comprises a PCI-E media access controller (MAC), network management cards 48 can be mounted in PCI-E slots 52 and 68 in order to network server 26 with networking switch 24.

By processor 62 executing server manager 65 and networking switch manager 67, embodiments of the present invention enable optimizing the performance of server manager 65 by incorporating features of networking switch 26 into the server manager. For example, server manager 65 can monitor load balancing on the networking switch 26 to optimize performance of server 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
   a case comprising a front panel;
   multiple transceiver modules mounted on the front panel;
   at least one midplane communication adapter card comprising a first bus connector configured to transport bus signals, and a second bus connector configured to transport networking signals or the bus signals;
   a networking switch comprising a switch input/output (I/O) board mounted within the case, coupled to the multiple transceiver modules, and comprising multiple first bus slots configured to accept the second bus connectors, and networking switch circuitry coupled to the first bus slots and configured to establish a network connection between two or more of the transceiver modules; and
   a server comprising a computer motherboard mounted within the case, the computer motherboard comprising a bus having multiple second bus slots configured to accept the first bus connectors, and a processor configured to manage the networking switch circuitry of the networking switch and to receive and process data commands in response to communications received from the transceiver modules.

2. The apparatus according to claim 1, wherein the case comprises a standard form factor configured to be inserted into a data center rack.

3. The apparatus according to claim 1, wherein the computer motherboard comprises a standard size computer motherboard, and wherein accepting the first and the second bus connectors establish a board-to-board connection between the switch I/O board and the computer motherboard.

4. The apparatus according to claim 3, wherein the second bus slots lie in proximity to each other on the standard size motherboard.

5. The apparatus according to claim 1, wherein the first and the second bus connectors comprise PCI-E bus connectors, and wherein the first and the second bus slots comprise PCI-E bus slots.

6. The apparatus according to claim 5, wherein the bus signals comprise PCI-E data packets.

7. The apparatus according to claim 1, wherein the networking signals comprise Ethernet frames.

8. The apparatus according to claim 1, wherein the networking switch circuitry comprises a PCI-E media access controller, and wherein the networking signals comprise PCI-E data packets.

9. The apparatus according to claim 1, wherein the switch I/O board and the computer motherboard are mounted within the case so that the first bus slots are adjacent to the second bus slots.

10. The apparatus according to claim 1, wherein the networking switch comprises a network element selected from a list consisting of a network process, a field programmable gate array (FPGA) device, and a multiport networking device.

11. A method, comprising:
    providing a case comprising a front panel;
    mounting multiple transceiver modules on the front panel;
    providing at least one midplane communication adapter card comprising a first bus connector configured to transport bus signals, and a second bus connector configured to transport networking signals or the bus signals;
    mounting, within the case, a networking switch comprising a switch I/O board, the switch I/O board being coupled to the multiple transceiver modules, and comprising multiple first bus slots configured to accept the second bus connectors, and network switch circuitry of the networking switch coupled to the first bus slots and configured to establish a network connection between two or more of the transceiver modules;
    mounting, within the case, a server comprising a computer motherboard, the computer motherboard comprising a processor and a bus having multiple second bus slots configured to accept the first bus connectors;
    managing, by the processor, the networking switch circuitry; and
    receiving and processing, by the processor, data in response to communications received from the transceiver modules.

12. The method according to claim 11, wherein the case comprises a standard form factor configured to be inserted into a data center rack.

13. The method according to claim 11, wherein the computer motherboard comprises a standard size computer motherboard, and wherein accepting the first and the second bus connectors establishes a board-to-board connection between the switch I/O board and the computer motherboard.

14. The method according to claim 13, wherein the second bus slots lie in proximity to each other on the standard size motherboard.

15. The method according to claim 11, wherein the first and the second bus connectors comprise PCI-E bus connectors, and wherein the first and the second bus slots comprise PCI-E bus slots.

16. The method according to claim 15, wherein the bus signals comprise PCI-E data packets.

17. The method according to claim 11, wherein the networking signals comprise Ethernet frames.

18. The method according to claim 11, wherein the networking switch circuitry comprises a PCI-E media access controller, and wherein the networking signals comprise PCI-E data packets.

19. The method according to claim 11, wherein the switch I/O board and the computer motherboard are mounted within the case so that the first bus slots are adjacent to the second bus slots.

20. The method according to claim 11, wherein the networking switch comprises a network element selected from a list consisting of a network process, a field programmable gate array (FPGA) device, and a multiport networking device.

21. The apparatus according to claim 1, wherein the midplane communication adapter card comprises a network controller, mounted on the communication adapter card, configured to convert the networking signals to the bus signals and to convert the bus signals to the networking signals.

22. The apparatus according to claim 21, wherein the network controller comprises a network processor.

23. The apparatus according to claim 2, wherein the switch I/O board and the motherboard are mounted horizontally within the case so that the switch I/O board and the motherboard are positioned horizontally within the data center rack.

24. The apparatus according to claim 1, wherein the processor is configured to manage the networking switch circuitry of the networking switch by controlling the network switch circuitry to perform operations selected from a group consisting of load balancing and connection management routing.

25. The method according to claim 11, wherein the midplane communication adapter card comprises a network controller, mounted on the communication adapter card, configured to convert the networking signals to the bus signals and to convert the bus signals to the networking signals.

26. The method according to claim 25, wherein the network controller comprises a network processor.

27. The method according to claim 12, and comprising mounting the switch I/O board and the motherboard horizontally within the case so that the switch I/O board and the motherboard are positioned horizontally within the data center rack.

28. The method according to claim 11, wherein managing the networking switch circuitry comprises controlling the network switch circuitry to perform operations selected from a group consisting of load balancing and connection management routing.

* * * * *